(12) United States Patent
Andrikowich et al.

(10) Patent No.: US 7,684,146 B1
(45) Date of Patent: Mar. 23, 2010

(54) HERMETIC SEAL FOR A SPINDLE MOTOR OF A DISK DRIVE

(75) Inventors: Thomas G. Andrikowich, Whitinsville, MA (US); Michael C. Strzepa, Shrewsbury, MA (US)

(73) Assignee: Maxtor Corporation, Scotts Valley, CA (US)

( * ) Notice: Subject to any disclaimer, the term of this patent is extended or adjusted under 35 U.S.C. 154(b) by 793 days.

(21) Appl. No.: 11/561,776

(22) Filed: Nov. 20, 2006

Related U.S. Application Data (60) Provisional application No. 60/738,719, filed on Nov. 22, 2005.

(51) Int. Cl.
  *G11B 33/14* (2006.01)
  *G11B 17/08* (2006.01)
(52) U.S. Cl. ............... 360/97.02; 360/98.07; 310/67 R; 310/90; 361/679.33; 361/679.36
(58) Field of Classification Search ... 360/97.01–97.03, 360/98.07, 99.08; 310/67 R, 90; 361/679.33, 361/679.36
  See application file for complete search history.

(56) References Cited

U.S. PATENT DOCUMENTS

| | | | |
|---|---|---|---|
| 5,559,650 A * | 9/1996 | Repphun et al. ......... 360/97.02 |
| 6,144,178 A | 11/2000 | Hirano et al. |
| 6,501,615 B1 * | 12/2002 | Kelsic et al. ............. 360/97.02 |
| 6,522,980 B1 | 2/2003 | Arnold |
| 6,644,362 B2 | 11/2003 | Bernett |
| 6,646,821 B2 | 11/2003 | Bernett et al. |
| 6,819,517 B2 | 11/2004 | Fioravanti et al. |
| RE38,673 E * | 12/2004 | Elsasser et al. .......... 360/98.07 |
| 6,831,811 B1 | 12/2004 | Andrikowich et al. |
| 6,999,262 B2 | 2/2006 | Han et al. |

* cited by examiner

*Primary Examiner*—William J Klimowicz
*Assistant Examiner*—Gustavo Polo
(74) *Attorney, Agent, or Firm*—Fellers, Snider, et al.

(57) ABSTRACT

A hermetic seal is provided for sealing discrete openings in a disk drive, such as an opening made in a base plate of the drive for a spindle motor shaft and openings made in the base plate for spindle motor lead wires. The hermetic seal for the spindle motor shaft comprises an undercut made in the portion of the spindle shaft that is secured to the base plate, and an epoxy material fills the gap between the surface defining the opening and the undercut made in the spindle motor shaft. Epoxy is also used to seal the openings made for the motor lead wires. The invention also comprises the method by which the base plate casting may be sealed by a two-time resin impregnation process which fills exposed pores on the surfaces of the castings.

19 Claims, 6 Drawing Sheets

HERMETIC SEAL FOR A SPINDLE MOTOR OF A DISK DRIVE

CROSS REFERENCE TO RELATED APPLICATION

Priority is claimed from U.S. Provisional Patent Application No. 60/738,719, filed On Nov. 22, 2005, and entitled "HERMETIC SEAL FOR A SPINDLE MOTOR SHAFT", the disclosure of which is incorporated herein by reference in its entirety.

FIELD OF THE INVENTION

The present invention relates to low density gas-filled hard disk drives and, more particularly, to a seal for a spindle motor shaft and spindle motor lead wires of the disk drive to contain a pressurized gas environment in the disk drive.

BACKGROUND OF THE INVENTION

Hard disk drives incorporate magnetic storage disks and read/write heads that are capable of reading data from and writing data onto the rotating storage disks. Data is typically stored on each magnetic storage disk in a number of concentric tracks on the disk. The read/write heads, also referred to as read/write transducers or read/write elements, are integrated within a slider. The slider, in turn, is part of an actuator assembly that positions the heads relative to the surface of the storage disks. This may be at a predetermined height above the corresponding storage disk or, in some instances, in contact with the surface of the storage disk. The actuator assembly is typically positioned by a voice coil motor that acts to position the slider over a desired track. One or more read/write heads may be integrated within a single slider. In the case of non-contact sliders, a cushion of air is generated between the slider and the rotating disk. The cushion is often referred to as an air bearing.

Hard disk drives are an efficient and cost effective solution for data storage. Depending upon the requirements of the particular application, a disk drive may include anywhere from one to a plurality of hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

A primary goal of disk drive assemblies is to provide maximum recording density on the storage disk. In order to provide greater storage capacity on a storage disk, track widths have become increasingly narrower. However, decreasing the width of tracks makes it more difficult for the read/write heads to accurately read and write information to and from the narrowing tracks. Not only is it difficult to physically position the read/write element over a narrow width track, but also it is increasingly difficult to maintain the read/write element over the track at an optimal position for accurate data transfer. Air turbulence created by the spinning disks, disk flutter and spindle vibrations, temperature and altitude can all adversely effect registration of the read/write element relative to the tracks. Moreover, increasing the speed of the rotating disks to achieve increased data access times increases air turbulence, which increases misregistration between the read/write element and the tracks on the storage disks (track misregistration or TMR). Higher rotational speeds can also increase disk flutter and spindle vibrations further increasing TMR. Higher rotational speeds can also increase spindle motor power and idle acoustics.

Accuracy can be further adversely affected if the read/write heads are not maintained within an optimum height range above the surface of the storage disk. Thus, a related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. Contact positioning of the slider permits tracks to be written more narrowly and reduces errors when writing data to the tracks. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the read/write transducer and the disk surface resulting, in turn, in failure of the transducer, which can cause catastrophic failure.

Similarly, the efficiency of reading data from a disk increases as the read element is moved closer to the disk. Because the signal to noise ratio increases with decreasing distance between the magnetic transducer and the disk, moving the read/write element closer to the disk increases reading efficiency. As previously mentioned, the ideal solution would be to place the slider in contact with the disk surface, but there are attendant disadvantages. In non-contact disk drives there are also limitations on how close a read/write element may be to the surface of a disk. A range of spacing is required for several reasons, including the manufacturing tolerances of the components, texturing of the disk surface and environmental conditions, such as altitude and temperature. These factors, as well as air turbulence, disk flutter and spindle vibration, can cause the read/write element flying height to vary or even cause the read/write element to contact the spinning disk.

Disk drives are assembled in a clean room to reduce contamination from entering the drive prior to final assembly. Thus, the air that is trapped within the drive once it is finally sealed is filtered room air. Accordingly, seals or gaskets used in disk drives between the housing components, such as between the base plate and cover, are designed to prevent contaminants from entering the drive. Such seals are not designed to prevent internal air and other gases from exiting through the seal and out of the drive. Loss of gas in this manner is anticipated and accommodated by use of a filtered port to maintain equalized air pressure within the drive compared to that of air pressure outside of the drive.

As an alternative to air-filled drives, advantages may be achieved by filling disk drives with gases having a lower density than air. For example, helium has a lower density than air at similar pressures and temperatures and can enhance drive performance. As used herein, a low-density gas or a lower density gas means a gas having a density less than that of air. When compared with air, lower density gases can reduce aerodynamic drag experienced by spinning disks within the drive, thereby reducing power requirements for the spindle motor. A low-density gas-filled drive thus uses less power than a comparable disk drive that operates in an air environment. Relatedly, the reduction in drag forces within the low-density gas-filled drive reduces the amount of aerodynamic turbulence that is experienced by drive components such as the actuator arms, suspensions and read/write heads. Some low density gases also have greater thermal conductivity, which results in better motor efficiencies and therefore lower power consumption for a given performance level. Reduction in turbulence allows drives filled with low density gas to operate at higher speeds compared with air-filled drives, while maintaining the same flying height and thereby maintaining the same range of read/write errors. Low density gas-filled drives also allow for higher storage capacities through higher recording densities due to the fact that there is less turbulence within the drive which allows the tracks to be spaced more closely together.

Despite these advantages, low-density gas-filled drives have not been commercially successful. Low-density gas-filled drives, in order to function, must be effectively sealed over an acceptable lifetime of the drive. It has been difficult to prevent the low-density gas from escaping from the sealed drive environment. Unlike air-filled drives, a port may not be used to equalize pressure outside and inside the drive. As a result, the seal between the cover and base plate must minimize or prevent leakage and maintain a threshold level of low-density gas within the sealed environment over the expected lifetime of the drive. Conventional rubber seals used in air-filled drives are inadequate at preventing leakage of low-density gas due to the smaller atom size of low-density gases, such as helium, compared to air. The smaller helium atoms diffuse through the rubber seals, thereby reducing the volume of low-density gas within the drive. Thus, over time, the necessary threshold quantity of low-density gas may be lost within the drive environment and may or may not be replaced with ambient air. In either case, the performance of the drive will change from the design specifications, namely, a low-density gas-filled sealed environment. As the low-density gas leaks out of a drive and is replaced by air, the drive is subject to undesirable operational effects possibly leading to unacceptable error rates and/or failure of the drive. For example, the increased concentration of air may increase the turbulent forces on the heads due to the increased drag forces within the drive which may further cause the heads to fly at too great a distance above the disks and potentially increasing instances of read/write errors. If the low density gas leaks from the sealed environment over time and is not replaced by ambient air, problems will occur such as the heads flying at a distance too close or in contact with the disks, thereby increasing instances of read/write errors as well as damage to the disk surface and head and higher operating temperatures due to a reduction in conduction cooling. Each creates a reliability risk. The risk of unanticipated failures due to inadequate amounts of low-density gas within the drive is a drawback to low density gas-filled drives. Indeed, data stored within the drive may be irretrievably lost if the drive fails due to the loss of the low-density gas environment.

Low-density gas-filled drives also must be designed to permit testing and rework, if necessary. Thus, the ability to seal openings in the base plate and/or cover plate on a temporary basis and on a long-term basis must exist. Such openings include, but are not limited to, openings for securing ends of the spindle and actuator shafts to the cover or base plate, or openings to permit self-servo writing. These openings must be adequately sealed to permit testing of the drive under normal conditions and, if possible, unsealed to permit rework. Thus, it is desirable to minimize waste and optimize efficiencies when sealing a disk drive housing to allow rework when needed. It is also desirable to seal openings through which electrical connections are made between components inside and outside the disk drive housing. One example of sealing an opening through which electrical connections are made is disclosed in co-pending application Ser. No. 10/839,606 entitled "Method for Controlled Fabrication of Hermetically Sealed PCB Connector", which is incorporated by reference herein in its entirety. Another example of sealing various types of openings in a disk drive is disclosed in co-pending application Ser. No. 10/839,685 entitled "Seal-Type Label to Contain Pressurized Gas Environment", which is also incorporated herein by reference in its entirety.

In addition to sealing the openings made in the disk drive base plate and top cover, the base plate and top cover themselves must be made impermeable to gas passage by treating these components. One solution for making these components impermeable to gas passage includes the co-pending application Ser. No. 10/839,608 entitled "Process to seal Aluminum Die Castings to Contain Low Density Gas", which is also incorporated herein by reference in its entirety. This application discloses a single or two-time resin impregnation to fill exposed pores on the surfaces of the castings that may otherwise allow gas passage through the die casting material. The two-time process begins with providing a low porosity casting material. The casting is cleaned and degreased. The casting is placed in a vacuum chamber to remove air from the pores in the casting. While under vacuum, a resin is applied to the casting. Pressure greater than or equal to one atmosphere is introduced to fill all of the surface pores and seal the casting. The casting is washed and subject to a curing process. The casting is then subjected to machining, if necessary, to bring it into specification compliance. The process is repeated for a second resin impregnation of the casting. The casting is then heated to finally seal the resin and to out-gas impurities. In the case of the single resin impregnation process, a fully machined low porosity casting is used at the start of the process flow.

SUMMARY OF THE INVENTION

In accordance with the present invention, a seal is provided for use in sealing the spindle motor shaft and the spindle motor lead wires of the disk drive. The seal is especially adapted for use in low-density gas-filled drives to provide a long-term solution for maintaining a seal at the location of the opening in the base plate of the drive that receives the spindle motor shaft. The seal also enables the drive to be re-worked as necessary since the seal can be removed without destroying the seal and without otherwise damaging components of the disk drive.

In a preferred embodiment of the present invention, the seal is created by the cooperation of a number of elements. For attachment of the spindle motor shaft to the opening in the base plate, an undercut on a base of the spindle shaft is provided and epoxy is potted around the circumference of the undercut prior to attachment of the spindle shaft to the base plate. The interface established between the spindle shaft base, the epoxy filling the undercut, and the base plate casting that abuts the epoxy creates a hermetic seal for the spindle shaft opening.

For sealing of the motor lead wires, discrete openings are formed through the base plate adjacent the location of the opening that receives the spindle shaft. Preferably each wire is placed in a separate opening to ensure that each wire can be sealed since groups of wires have inherent air gaps between individual wires making it more difficult or impossible to effectively seal groups of wires. The exterior surface of the base plate includes a cavity that communicates with the motor lead wire openings. The cavity extends along the exterior surface of the base plate towards an electrical connector that interconnects the spindle motor lead wires to a printed circuit board assembly. The cavity formed on the exposed exterior surface of the base plate is also potted with epoxy. The interface established between the wires, epoxy, and the base plate casting that abuts the epoxy creates a hermetic seal for the motor lead wire openings.

These and other features and advantages of the present invention will become more apparent from a review of the follow Detailed Description, taken in conjunction with the drawings.

DETAILED DESCRIPTION

Figure 1:
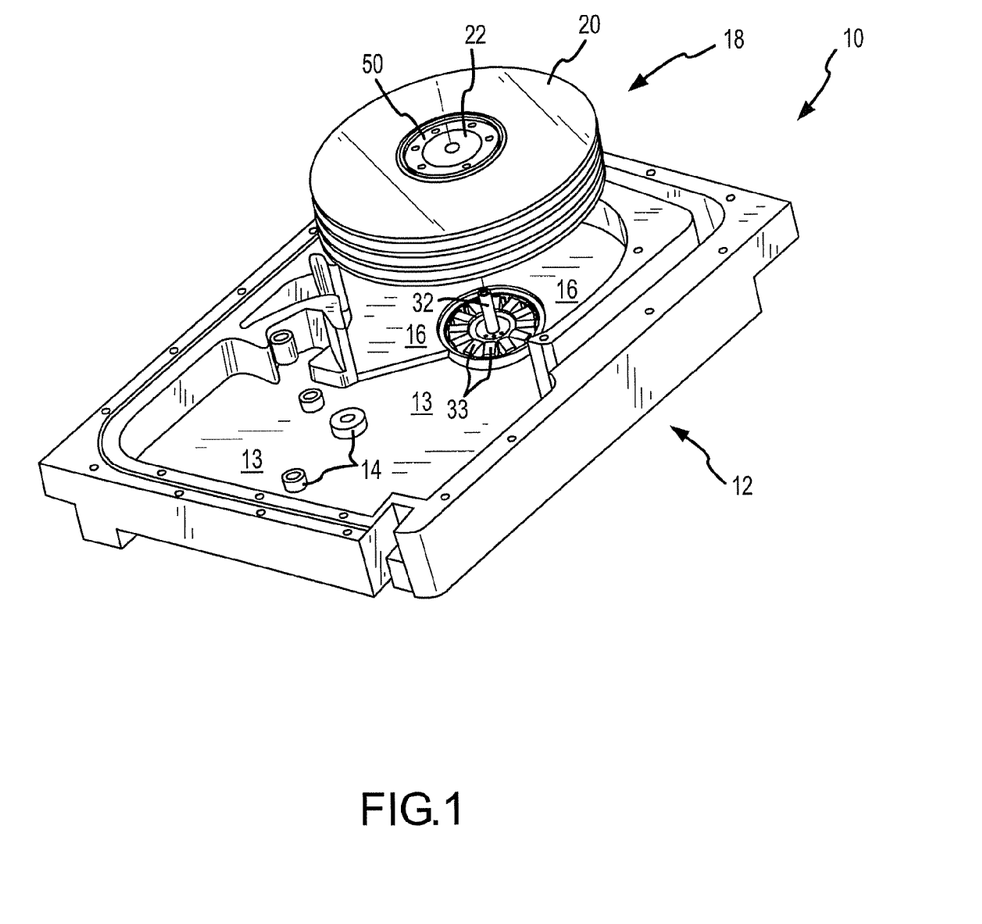
FIG. 1 is a perspective view illustrating a base plate of a disk drive housing, a disk pack aligned for installation within the base plate, and a spindle motor shaft secured to the base plate.

FIG. 1 illustrates one part of a housing assembly 10 of a disk drive, namely, the base plate 12. As shown, the base plate is a rectangular shaped member having an interior 13 that houses components of the disk drive. Various protruding features 14 may be found within the interior 13 of the base plate 12 to accommodate attachment of the components of the disk drive. One portion 16 of the interior 13 includes an area to receive a disk pack 18. The disk pack 18 may include a plurality of data disks 20 stacked over a hub 22, and a disk clamp 50 (best seen in FIG. 6) is secured over the upper end of the hub 22. As also shown in FIG. 1, a spindle motor shaft 32 is shown protruding from the base plate, and some components of the spindle motor are shown, namely, the motor stators 33.

Figure 2:
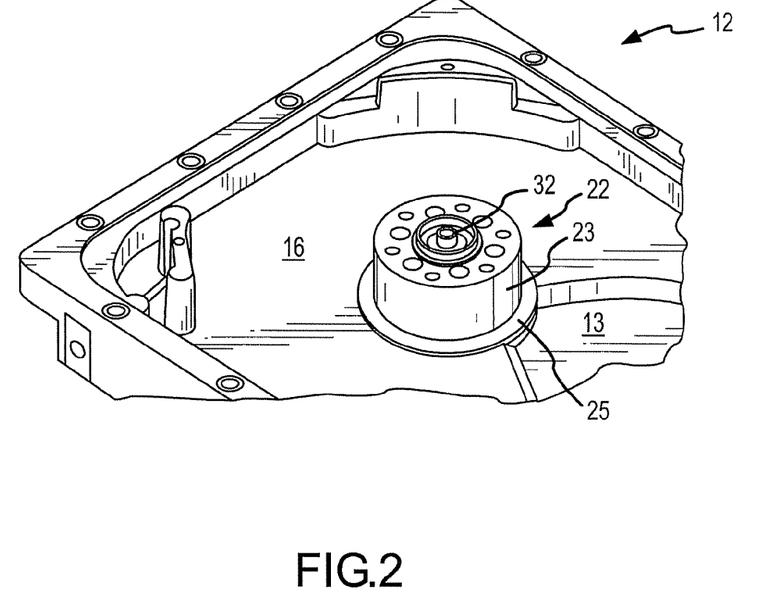
FIG. 2 is an enlarged fragmentary perspective view of the base plate, showing the hub of the disk pack mounted for operation.

Referring to FIG. 2, the huh 22 is shown mounted in the base plate, and the disks 20 have been deleted in this figure for clarity. The spindle shaft 32 protrudes through the center of the hub 22. The hub 22 has a cylindrical side surface 23, and a base portion 25.

Figure 3:
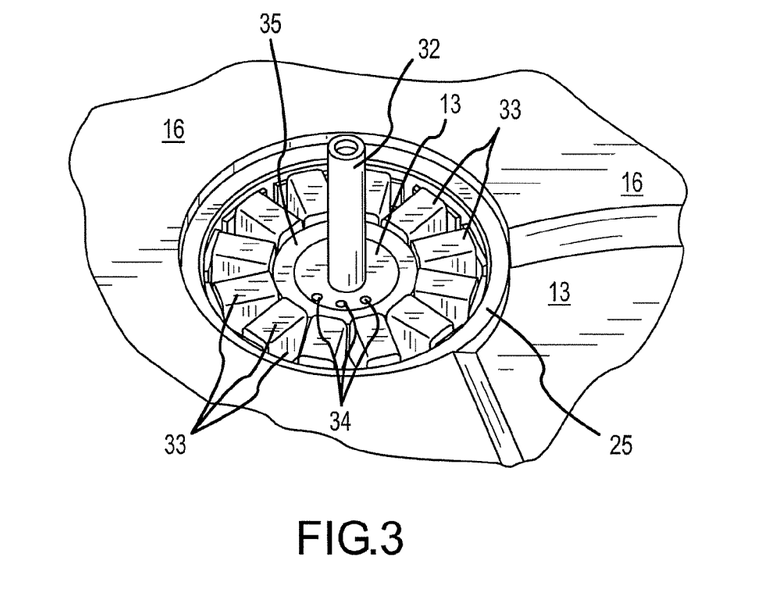
FIG. 3 is a greatly enlarged fragmentary perspective view of the spindle shaft protruding from the base plate, along with discrete openings formed in the base plate that receive spindle motor lead wires.

Referring to FIG. 3, the upper portion of the hub 22 has been removed, thus exposing components of the spindle motor, shown as the motor stators 33. The spindle shaft 32 protrudes through a spindle shaft opening made in the base plate. Three smaller openings 34 are made through the base plate to accommodate motor lead wires. As shown, these three openings are each spaced from the spindle motor shaft and are located in the space 35 between the stators 33 and the shaft 32.

Figure 4:
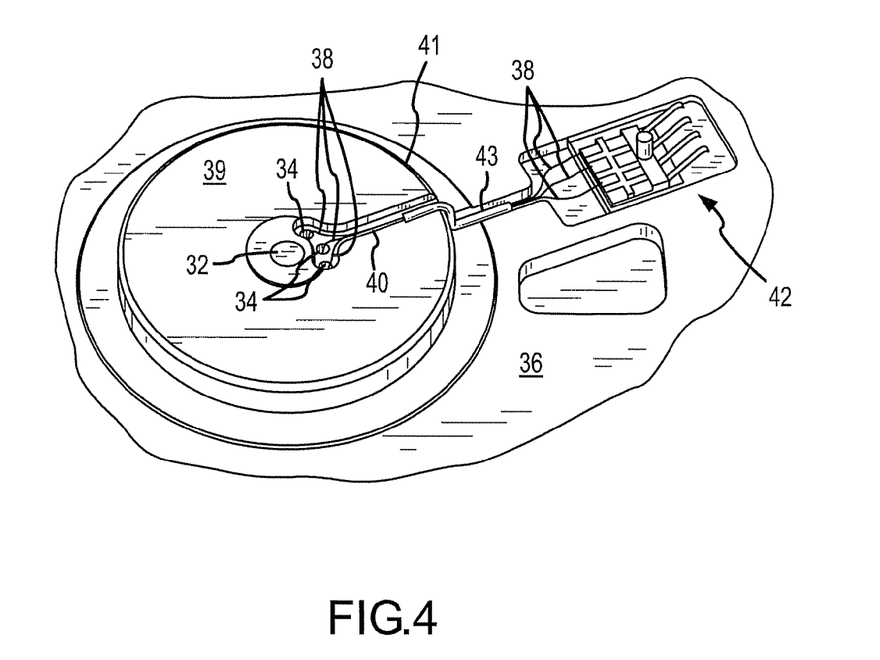
FIG. 4 is a fragmentary perspective view illustrating a lower surface of the base plate and illustrating the openings for the motor lead wires, and a cavity formed on the lower surface of the base plate for routing of the wires.
Figure 5:
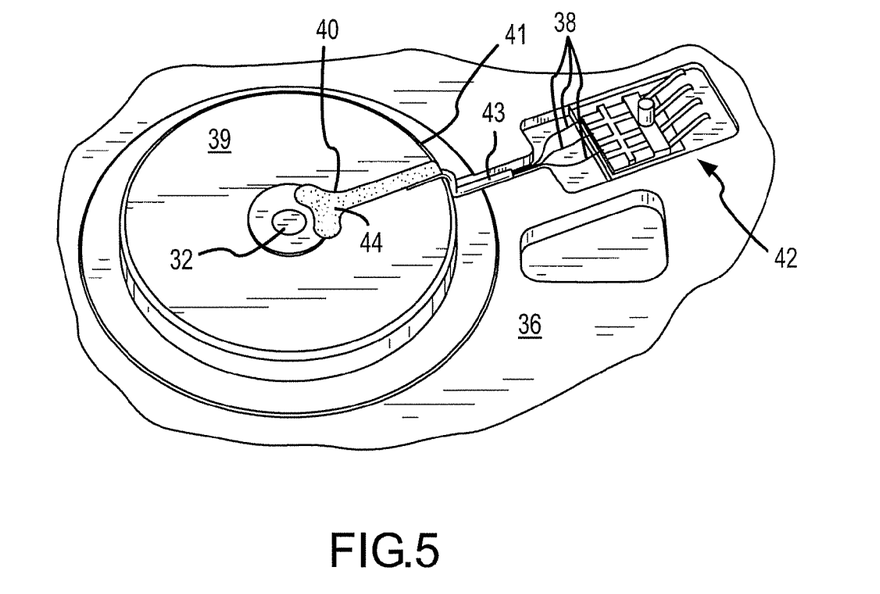
FIG. 5 is another fragmentary perspective view as shown in FIG. 4, but illustrating the cavity potted with an epoxy.

Referring to FIG. 4, the lower surface 36 of the base plate is shown. The lower surface 36 may include a raised or protruding area 39 that generally corresponds to the area where the hub resides on the opposite surface of the base plate. A lower exposed surface of the spindle shaft 32 is shown, and the lead wire openings 34 are also illustrated in their position adjacent to the shaft 32. Three spindle motor lead wires 38 are illustrated wherein each lead wire 38 is routed through a corresponding opening 34. The opposite ends of the wires 38 extend through a cavity 40 that is formed on the raised area 39, the cavity including a main portion that surrounds the location of the lead wire openings 34, and a channel that extends outward and away from the openings 34 toward an electrical connector 42. The connector 42 is used to connect the lead wires 38 of the spindle motor to a printed circuit board assembly (not shown). In order to seal the wires 38 as they pass through the base plate, an epoxy 44 is used to fill the cavity 40. The epoxy 44 may be applied such that it also extends at least partially through the openings 34. The epoxy may terminate at the edge 41 of the raised area 39 wherein the wires 38 are then bundled within a sheath 43 as they extend toward the electrical connector 42, or the epoxy may be applied to extend all the way towards the electrical connector thereby also sealing the sheath 43 against the lower surface 36 of the base plate. Thus, the motor lead wires are hermetically sealed with respect to the base plate, yet an efficient and reliable electrical connection may be made between the printed circuit board assembly and the spindle motor.

Figure 6:
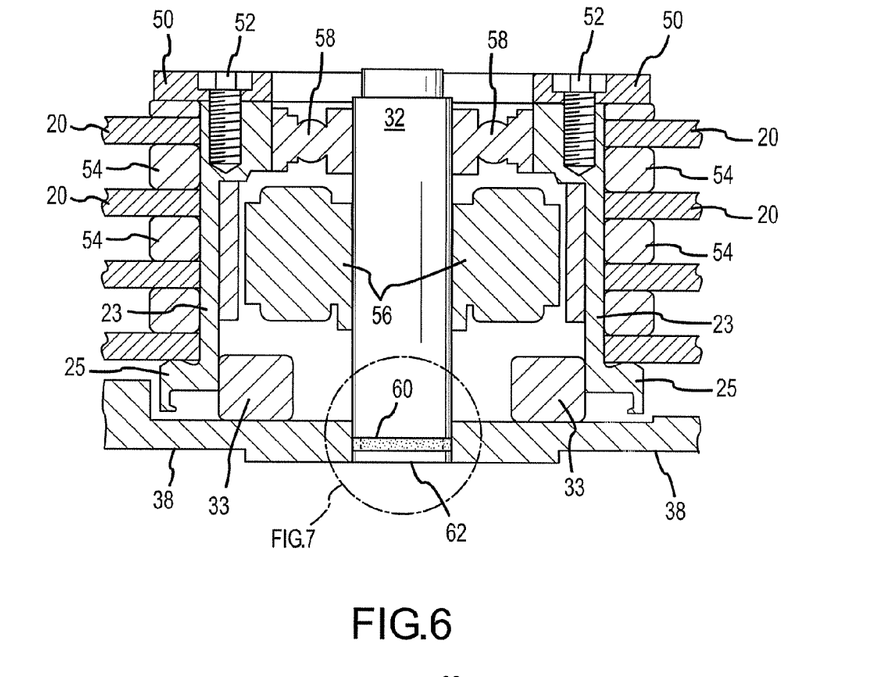
FIG. 6 is a vertical cross-section taken through the disk pack when installed, and particularly showing how the spindle shaft is sealed in the opening of the base plate.
Figure 7:
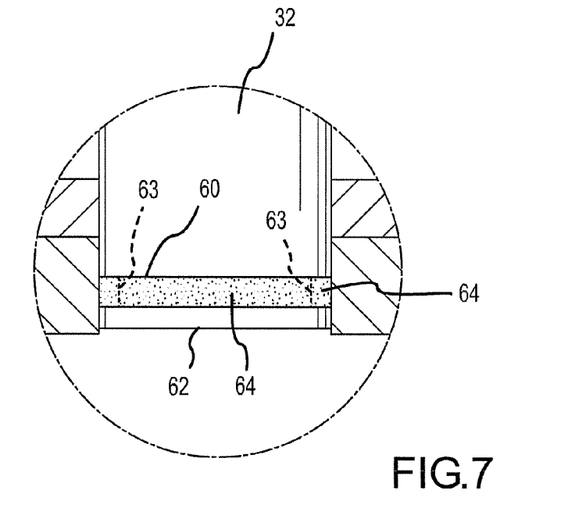
FIG. 7 is a greatly enlarged portion of FIG. 6 illustrating how the lower end of the spindle shaft is sealed in the opening of the base plate.

Referring now to FIGS. 6 and 7, the manner in which the spindle shaft 32 is sealed to the base plate is shown. FIG. 6 is intended to illustrate a conventional disk pack and shows further details of the disk pack. A plurality of data disks 20 are separated from one another by a plurality of spacers 54. The disk clamp 50 is secured to the upper portion of the hub 22 by screws 52. Various interior details of the hub assembly are shown to include a motor rotor 56, motor bearings generally shown at reference number 58, as well as the motor stators 33. Hermetic sealing of the shaft 32 with respect to the base plate is achieved by an undercut 60 that is formed circumferentially around a lower portion 62 of the spindle shaft 32. Dotted lines 63 indicated the depth of the undercut if viewing the shaft 32 in cross-section. The undercut 60 is filled with an epoxy material 64 to form the hermetic seal. The depth, shape, and height of the undercut 60 can be modified in order to provide the most efficient hermetic seal. One acceptable type of potting material that may be used to seal both the motor lead wires and the spindle shaft is Bacon LC-4. This epoxy has an acceptable viscosity and its thermal coefficient of expansion closely matches that of aluminum. Aluminum is the most common material used for the base plate and top cover of the disk drive.

Figure 8:
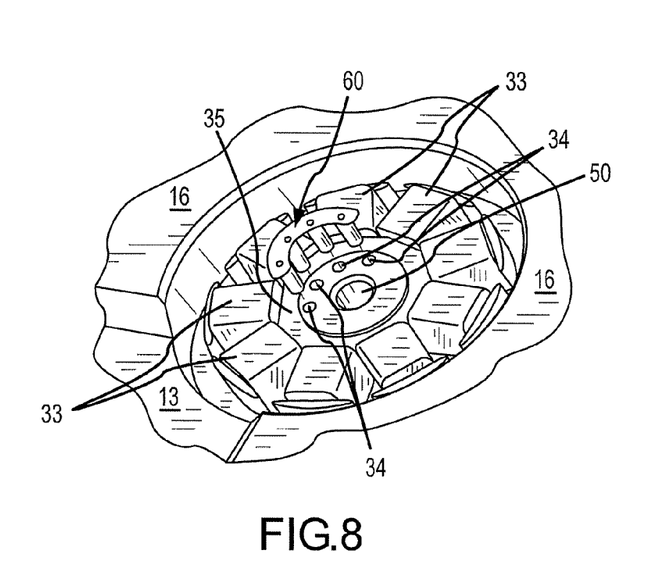
FIG. 8 is a fragmentary perspective view of another embodiment of the present invention including an insulating hushing that helps in routing motor lead wires.
Figure 9:
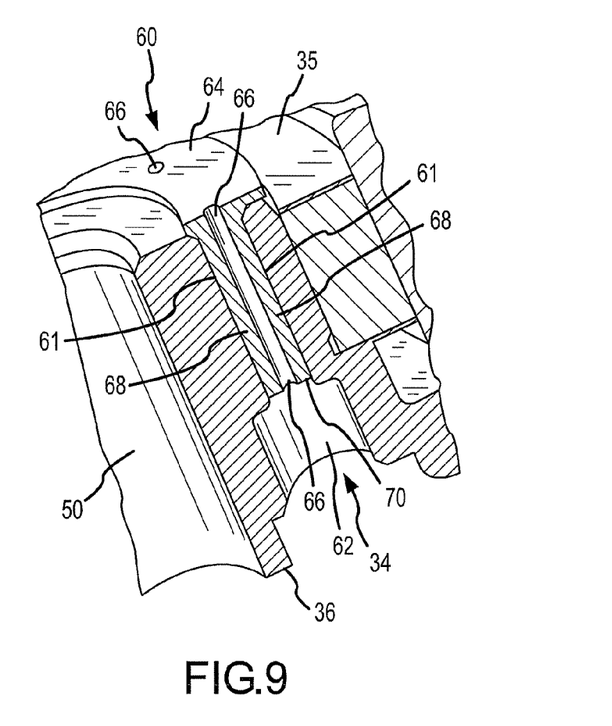
FIG. 9 is an enlarged fragmentary perspective cross-sectional view illustrating the bushing installed in the embodiment of FIG. 8.

FIG. 8 illustrates another embodiment of the present invention wherein an insulating bushing 60 is used for routing of the motor lead wires 38 through the openings 34 made in the base of the drive. In this figure, the bushing 60 is shown prior to installation. Four openings 34 are made in the base to accommodate a configuration of four motor lead wires in this embodiment. Referring to FIG. 9, the bushing 60 is shown installed. The bushing 60 includes a body 64 and a plurality of legs or extensions 68, one leg 68 for each opening 34. A motor lead wire opening 66 is formed through each leg 68. A single motor lead wire is routed through each corresponding opening 66 in the bushing 60. FIG. 9 also illustrates that the opening 34 can be non-uniform in diameter such that the portion of the opening 61 located near to the upper surface of the base has a smaller diameter to accommodate a friction fit with the leg 68, while the portion 62 of the opening 34 located near the lower surface 36 of the base has a larger diameter. As shown, the most distal edge 70 of the leg 68 terminates near the transition between portions 61 and 62. However, it should also be understood that the opening 34 can be uniform in diameter.

Figure 10:
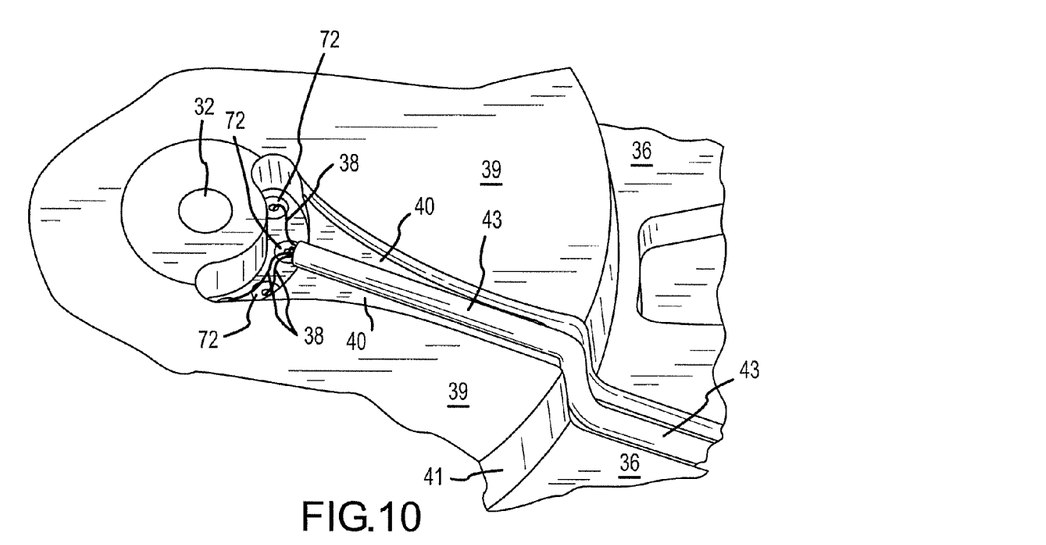
FIG. 10 is a fragmentary perspective view of the lower surface of the embodiment of FIG. 8.

Referring to FIG. 10, the lower surface 36 of the base is shown wherein respective motor lead wires 38 are each routed through the respective openings in the bushing 60. Additionally, FIG. 10 illustrates a bushing 60 wherein the legs 68 extend completely through the openings 34 such that the distal end 70 is flush with the cavity 40. Accordingly, the openings 34 are preferably uniform in diameter. Therefore, it shall be understood that FIGS. 9 and 10 each illustrate distinct bushing configurations wherein the bushing may be used with non-uniform diameter openings 34 as shown in FIG. 9, or uniform-sized openings where the legs extend completely through the openings.

Figure 11:
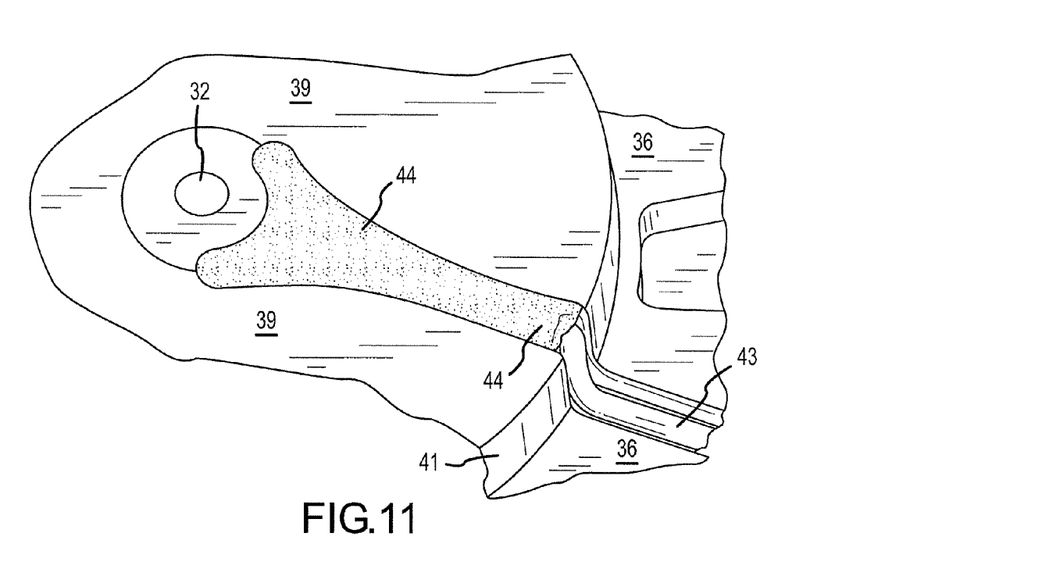
FIG. 11 is another fragmentary perspective view as shown in FIG. 10 but illustrating the cavity potted with an epoxy.

FIG. 11 shows the cavity 40 being filled with the potting material 44, such as an epoxy. As with the prior embodiments, the epoxy may terminate at the edge 41 of the raised area 39, and the wires 38 bundled within the sheath 44 extend toward the electrical connector 42 (not shown in FIGS. 10 and 11).

In accordance with another aspect of the present invention, combining the hermetic seal created for the motor lead wires and the spindle shaft is combined with a process of sealing the disk drive housing itself. The process may be used for the base plate of the disk drive, as well as the top cover of the disk drive. The base plate and top cover are each preferably made by a casting process.

The casting process results in components having voids or porous grain structure in the material. The size of the pores will vary depending upon the casting process. The size of the pores may be referred to as the porosity of the material. Although the process is described in association with aluminum casting components, it should be appreciated that the process would work with components made from other materials such as steel, zinc and magnesium.

As a threshold step, it is preferable that the disk drive housing components be created from a process that minimizes porosity within the components. For example, base plates and covers are typically made by a casting process using aluminum. Castings that meet the American Society of Testing and Methods (ASTM) E505, Category A, provide suitable low porosity components. Such castings have porosity in external part surfaces that does not exceed 0.127 millimeters in diameter. Internal pores may be larger. A desired level of porosity which does not exceed 0.127 millimeters in diameter may be achieved using chill block cooling or vacuum-assist methodology for die casting for type A380 or 383 aluminum.

Following creation of low porosity components, in a second step of the process the castings are subject to stress relief. Stress relief is achieved by heating the components. One exemplary process would subject the components to a temperature of 232° C. for four hours.

Following stress relief, the castings may be radially aligned in a device to hold the castings referred to as a fixture. The fixture may be placed in a metal basket of similar cylindrical dimensions for ease in handling, transportation and processing.

The castings are next subjected to a cleaning and degreasing process. The cleaning and degreasing process generally comprises a multi-step process where the components are subject to detergent wash and rinse cycles. The objective is to remove silicon and organics from the components.

Next, one or more baskets of castings may be placed in a variable pressure chamber such as an autoclave. A vacuum is created in the autoclave placing the internal absolute pressure to between 3 to 8 millibars. This removes air from the chamber, including air within the exposed voids on the surface of the component castings. A sealant, such as a methacrylate sealing resin, and a catalyst, such as mikrofine AZDN, are then transferred into the autoclave from a storage tank to a level in which the castings are submersed within the sealant. The catalyst and sealant are preferably maintained in the storage tanks at a temperature of between 15 and 20° C. by a cooling unit. Due to the nature of these chemicals, the lower temperature prevents the sealant from gelling or solidifying.

The submersed castings are maintained at the vacuum pressure for approximately ten minutes to twenty minutes. A valve on the autoclave is then opened to allow the chamber to return to atmospheric pressure. Within a few seconds of opening the valve, the change in pressure forces sealant into the exposed pores of the casting. The condition is maintained for an optimum time period. One known optimum time period is approximately two minutes. The sealant and catalyst solution are then returned to its storage tank and the basket containing the castings is removed from the autoclave.

The baskets containing the castings are then placed in a centrifuge. The baskets may be rotated in a clockwise direction for two minutes and then in a counterclockwise direction for two minutes. The purpose of rotating is to remove excess sealer and catalyst solution. The centrifuge process step lasts approximately five minutes.

The castings are then subject to a cleaning process. For example, the baskets may be transferred from the centrifuge to a dunk tank containing de-ionized water at room temperature. The basket containing the castings reciprocates in an up and down motion to remove sealer. Air agitation may also be added to the water. The basket is then placed in a second tank and subjected to a static wash where jets of water are directed against the castings to further remove surface sealer. This overall cleaning step lasts for approximately four minutes. The baskets containing the castings are next transferred to a rotary wash tank. The baskets rotate about a horizontal axis for approximately four minutes in one direction and for approximately four minutes in the opposite direction. The cleaning solutions from the dunk tank, static wash and rotary wash may be removed after one or more uses.

The castings are then subject to a curing step. More particularly, the castings are submersed in hot water bath and preferably, the temperature is maintained between 87 and 93° C. for approximately ten minutes. The hot bath cures the sealer within the pores of the components.

Next, the baskets containing the components are then placed in a vacuum dryer. Hot air is forced across the castings, further curing and drying the castings. Preferably, the environment in the vacuum dryer is maintained at less than 40 millibars absolute pressure for approximately twenty minutes at about 45° C.

Next, an epoxy coating is applied to the castings. This is accomplished by first subjecting the casting to an acid wash and then an electronic deposition process. The acid wash comprises a cleaning cycle followed by subjecting the components to an acid bath. The acid bath prepares the surface to receive the epoxy. The types of acids used are phosphoric and nitric acid.

The deposition process preferably comprises electron deposition of the epoxy onto the surface of the castings.

The casting is then baked at a temperature of approximately 230° C. to cure the epoxy coating.

The castings are then subjected to final machining to meet final dimensions. As part of the machining process, some epoxy and sealer is removed and/or additional pores may be partially exposed. To impregnate the castings twice, the castings are again subjected to another round of adding sealing resin by use of the variable pressure chamber, cleaning, curing, and drying.

The twice-impregnated castings are subjected then to a final cleaning similar to the initial cleaning, and are subject to a final curing process. The final curing process preferably includes baking the sealed casting for approximately two hours at 200° C. This process additionally cures the sealer as well as out gases impurities.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A disk drive base comprising:
    a base plate having a first side defining an interior of the base plate, and a second opposite side defining an exposed exterior surface of the base plate;
    a spindle shaft opening formed through said base plate;
    a spindle shaft having a lower end secured in said spindle shaft opening, said lower end having an undercut formed thereon;
    a first potting material filling a gap between said undercut and a surface defining said spindle shaft opening;
    a plurality of motor lead wire openings formed through said base plate and adjacent said spindle shaft opening;
    a cavity formed on said exposed exterior surface of said base plate, said cavity surrounding said plurality of motor lead wire openings; and
    a second potting material filling said cavity, thereby sealing motor lead wires extending through respective motor lead wire openings.

2. A base, as claimed in claim 1, wherein:
    said undercut is formed circumferentially around said lower end of said spindle shaft.

3. A base, as claimed in claim 1, wherein:
    said plurality of motor lead wire openings include three motor lead wire openings, and wherein single motor lead wires are routed through corresponding motor lead wire openings.

4. A base, as claimed in claim 1, wherein:
    said cavity includes a main portion surrounding said motor lead wire openings, and a channel connected to said main portion and extending outwardly away from said main portion, wherein said second potting material fills said main portion and at least part of said channel.

5. A base, as claimed in claim 1, further including:
    an insulating bushing having a plurality of legs, said legs of said bushing being placed in respective motor lead wire openings.

6. A base, as claimed in claim 1, wherein:
    said motor lead wire openings have a uniform diameter.

7. A base, as claimed in claim 1, wherein:
    said motor lead wire openings are non-uniform in diameter wherein a first portion of said motor lead wire openings have a first diameter, and a second portion of said motor lead wire openings have a second diameter.

8. A method of sealing an opening in a disk drive, said method comprising the steps of:
    providing a disk drive component opening through a disk drive base plate;
    providing a disk drive component having a lower end inserted in said opening, said lower end having an undercut formed thereon;
    placing a first potting material filling a gap between said undercut and a surface defining said opening in said base plate;
    forming a plurality of motor lead wire openings through said base plate and adjacent said component opening;
    forming a cavity on an exposed exterior side of said base plate and surrounding said plurality of motor lead wire openings;
    placing a second potting material filling said cavity and thereby sealing motor lead wires extending through said motor lead wire openings.

9. A method, as claimed in claim 8, wherein:
    said undercut is formed circumferentially around said lower end of said disk drive component.

10. A method, as claimed in claim 8, wherein:
    said plurality of motor lead wire openings include three motor lead wire openings and single motor lead wires extend through each said opening.

11. A method, as claimed in claim 8, wherein:
    said cavity further includes a main portion surrounding said plurality of motor lead wire openings, and a channel connected to said main portion and extending outward and away from said main portion, said second potting material filling said main portion and at least a part of said channel.

12. A method, as claimed in claim 8, further including the step of:
    inserting a bushing including a plurality of legs in respective motor lead wire openings.

13. A disk drive base, comprising:
    a base plate having a first side defining an interior cavity of the base plate, and a second, opposite side defining an exposed exterior surface of the base plate;
    a disk drive component opening formed through said base plate for receiving a disk drive component therethrough;

means for sealing said disk drive component with respect to said disk drive component opening, said means for sealing including an undercut formed on said component and said undercut residing in said component opening when said disk drive component is secured to the base plate, said means for sealing further including a first potting material filling a gap between said undercut and a surface defining said disk drive component opening;

a plurality of motor lead wire openings formed through said base plate and adjacent said spindle shaft opening; and a second potting material filling said plurality of motor lead wire openings, thereby sealing motor lead wires extending through respective motor lead wire openings.

14. A base, as claimed in claim 13, further including:

an insulating bushing having a plurality of legs, said legs of said bushing being placed in respective motor lead wire openings.

15. A base, as claimed in claim 13, further including:

a cavity formed on said exposed exterior surface of said base plate, said cavity surrounding said plurality of motor lead wire openings and said second potting material further filling said cavity.

16. A base, as claimed in claim 13, wherein:

said undercut is formed circumferentially around a lower end of said disk drive component inserted through said disk drive component opening.

17. A base, as claimed in claim 13, wherein:

said cavity includes a main portion surrounding said motor lead wire openings, and a channel connected to said main portion and extending outwardly away from said main portion, wherein said second potting material fills said main portion and at least part of said channel.

18. A disk drive base comprising:

a base plate having a first side defining an interior cavity of the base plate, and a second, opposite side defining an exposed exterior surface of the base plate;

a plurality of motor lead wire openings formed through said base plate;

a cavity formed on said exposed exterior surface of said base plate, said cavity surrounding said plurality of motor lead wire openings; and a first potting material filling said cavity, thereby sealing motor lead wires extending through said respective motor lead wire openings.

19. A base, as claimed in claim 18, further including:

a spindle shaft opening formed through said base and adjacent said plurality of motor lead wire openings;

a spindle shaft having a lower end secured in said spindle shaft opening, said lower end having an undercut formed thereon; and a second potting material filling a gap between said undercut and a surface defining said spindle shaft opening.

* * * * *